(12) United States Patent
Maier

(10) Patent No.: US 10,343,554 B2
(45) Date of Patent: Jul. 9, 2019

(54) SEAT RAIL

(71) Applicant: Thunder Power New Energy Vehicle Development Company Limited, Central (HK)

(72) Inventor: Jens Maier, Milan (IT)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 15/697,227

(22) Filed: Sep. 6, 2017

(65) Prior Publication Data

US 2018/0065506 A1 Mar. 8, 2018

Related U.S. Application Data

(60) Provisional application No. 62/384,298, filed on Sep. 7, 2016.

(51) Int. Cl.
*B62D 25/20* (2006.01)
*B60N 2/06* (2006.01)
(Continued)

(52) U.S. Cl.
CPC ............. *B60N 2/015* (2013.01); *B60N 2/02* (2013.01); *B60N 2/06* (2013.01); *B62D 21/03* (2013.01); *B62D 21/09* (2013.01); *B62D 25/20* (2013.01)

(58) Field of Classification Search
CPC .... B62D 25/20; B62D 25/2036; B62D 21/03; B62D 21/157; B60N 2/015; B60N 2/06
See application file for complete search history.

(56) References Cited

U.S. PATENT DOCUMENTS 5,820,204 A * 10/1998 Masuda ............... B62D 21/157
296/187.12
6,095,555 A * 8/2000 Becker ................. B60N 2/0224
280/735

(Continued)

FOREIGN PATENT DOCUMENTS

DE 102 32 843 A1 2/2004
EP 1 820 687 A1 8/2007
(Continued)

OTHER PUBLICATIONS

European Search Report for EP 17189969 dated Feb. 8, 2018, 5 pages.

*Primary Examiner* — Gregory A Blankenship
(74) *Attorney, Agent, or Firm* — Kilpatrick Townsend & Stockton LLP

(57) ABSTRACT

A seat mounting system for an electric vehicle including a longitudinal support beam coupled with a chassis of the vehicle, a front cross beam extending from a right side of a passenger compartment of the vehicle to a left side of the passenger compartment, and a rear cross beam extending from the right side to the left side. A connector is disposed between the longitudinal support beam and both cross beams. The connector couples the longitudinal support beam with both cross beams. At least one seat rail is mounted to the connector and extends across the front cross beam and the rear cross beam. The seat rail is mounted to the connector such that a forward portion of the at least one seat rail extends higher than a rear portion of the at least one seat rail. The seat rail mounts a seat within the passenger compartment.

18 Claims, 7 Drawing Sheets

(51) Int. Cl.
  *B60N 2/02* (2006.01)
  *B60N 2/015* (2006.01)
  *B62D 21/03* (2006.01)
  *B62D 21/09* (2006.01)

(56) References Cited

U.S. PATENT DOCUMENTS

| | | | | |
|---|---|---|---|---|
| 9,731,769 B2* | 8/2017 | Patel | ................. | B62D 25/2036 |
| 2002/0167200 A1* | 11/2002 | Uchida | ................. | B62D 25/20 |
| | | | | 296/204 |
| 2006/0272877 A1* | 12/2006 | Nozaki | ................. | B60K 1/04 |
| | | | | 180/291 |
| 2007/0126264 A1* | 6/2007 | Mizuma | ................. | B60N 2/015 |
| | | | | 296/204 |
| 2009/0134668 A1* | 5/2009 | Oezkan | ................. | B62D 25/20 |
| | | | | 296/193.07 |
| 2013/0076077 A1* | 3/2013 | Hirooka | ................. | B62D 25/20 |
| | | | | 296/204 |
| 2013/0088045 A1* | 4/2013 | Charbonneau | ....... | B62D 21/157 |
| | | | | 296/187.12 |
| 2013/0229030 A1* | 9/2013 | Yamaguchi | .............. | B60K 1/04 |
| | | | | 296/193.07 |
| 2014/0117716 A1* | 5/2014 | Patberg | ................. | B62D 21/157 |
| | | | | 296/187.08 |
| 2014/0327268 A1* | 11/2014 | Mori | ................. | B62D 21/157 |
| | | | | 296/187.08 |
| 2015/0001882 A1* | 1/2015 | Saje | ................. | B60N 2/015 |
| | | | | 296/187.12 |
| 2015/0145287 A1* | 5/2015 | Harwin | ................. | B60R 11/0217 |
| | | | | 296/193.07 |
| 2016/0159402 A1* | 6/2016 | Nakaya | ................. | B62D 25/20 |
| | | | | 296/193.02 |
| 2016/0200221 A1* | 7/2016 | Perlo | ................. | B62D 23/005 |
| | | | | 296/193.02 |
| 2016/0236717 A1* | 8/2016 | Shirooka | ................. | B62D 25/20 |
| 2017/0015360 A1* | 1/2017 | Onishi | ................. | B62D 21/157 |
| 2017/0036700 A1* | 2/2017 | Patel | ................. | B62D 25/2036 |
| 2017/0057551 A1* | 3/2017 | Saje | ................. | B62D 25/2036 |
| 2018/0065460 A1* | 3/2018 | Maier | ................. | B60K 1/04 |
| 2018/0065506 A1* | 3/2018 | Maier | ................. | B60N 2/015 |
| 2018/0065684 A1* | 3/2018 | Maier | ................. | B62D 25/2018 |
| 2018/0065688 A1* | 3/2018 | Maier | ................. | B60K 1/04 |
| 2018/0236863 A1* | 8/2018 | Kawabe | ................. | B60K 1/04 |
| 2018/0237075 A1* | 8/2018 | Kawabe | ................. | B62D 21/157 |

FOREIGN PATENT DOCUMENTS

GB 2483778 A 3/2012
WO 2015/079928 A1 6/2015

\* cited by examiner

SEAT RAIL

CROSS-REFERENCE TO RELATED APPLICATION

The present application claims the benefit of U.S. Provisional Application No. 62/384,298, filed Sep. 7, 2016, the entire contents of which are hereby incorporated by reference for all purposes.

BACKGROUND OF THE INVENTION

There are many problems unique to electric vehicles, oftentimes due to the presence of large and/or numerous batteries used to power the electric motor and other components of the vehicle. These batteries are often bulky, and add significant weight to the vehicles. These considerations present challenges in designing a particularly efficient and practical electrical vehicle. Additionally, these batteries may be particularly susceptible to damage during a collision. Damage to a battery may be especially dangerous by presenting a fire and/or corrosive hazard. As such, protecting the batteries from damage remains a difficult challenge unique to the field of electric vehicles.

BRIEF SUMMARY OF THE INVENTION

In one aspect, a seat mounting system for an electric vehicle is provided. The seat mounting system may include a longitudinal support beam coupled with a chassis of the electric vehicle, a front cross beam extending from a right side of a passenger compartment of the electric vehicle to a left side of the passenger compartment, and a rear cross beam extending from the right side to the left side. The seat mounting system may also include a connector disposed between the longitudinal support beam and both the front cross beam and the rear cross beam. The connector may be configured to couple the longitudinal support beam with both the front cross beam and the rear cross beam. The seat mounting system may also include at least one seat rail mounted to the connector. The at least one seat rail may extend across the front cross beam and the rear cross beam. The at least one seat rail may be mounted to the connector such that a forward portion of the at least one seat rail extends higher than a rear portion of the at least one seat rail. The at least one seat rail may be configured for mounting a seat within the passenger compartment.

In another aspect, a seat mounting system for an electric vehicle may include a longitudinal support beam coupled with a chassis of the electric vehicle, a front cross beam extending from a right side of a passenger compartment of the electric vehicle to a left side of the passenger compartment, and a rear cross beam extending from the right side to the left side. The seat mounting system may also include a connector disposed between the longitudinal support beam and both the front cross beam and the rear cross beam. The connector may be configured to couple the longitudinal support beam with both the front cross beam and the rear cross beam. The connector may include a first portion configured to receive an end of the front cross beam, a second portion configured to receive an end of the rear cross beam, and a third portion configured to engage with a medial portion of the longitudinal support beam. The third portion may include an elevated section configured to raise a height of the connector at a position above the front cross beam to a level higher than at a position above the rear cross beam. The seat mounting system may further include at least one seat rail extending across the front cross beam and the rear cross beam. The at least one seat rail may be mounted to the first portion and to the elevated section of the third portion of the connector such that a forward portion of the at least one seat rail positioned above the front cross beam extends higher than a rear portion of the at least one seat rail positioned above the rear cross beam. The at least one seat rail may be configured for mounting a seat within the passenger compartment.

In another aspect, a method for mounting a seat rail of an electric vehicle is provided. The method may include positioning a front cross beam at a base of a passenger compartment of an electric vehicle such that the front cross beam extends from a left side of the passenger compartment to a right side of a passenger compartment. The method may also include positioning a rear cross beam at the base such that the rear cross beam extends from the left side to the right side and securing an end of the front cross member within a first portion of a connector and an end of the rear cross member within a second portion of the connector. The method may further include positioning a medial portion of a longitudinal support beam against a third portion of the connector, securing the third portion of the connector to the medial portion of the longitudinal support beam, and securing a seat rail to a top of the connector such that a forward portion of the seat rail extends higher than a rear portion of the seat rail.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The systems and methods described herein relate generally to improvements for electric vehicles. Due to the size and weight considerations of the batteries required to power such vehicles, as well as the need to make electric vehicles as safe as possible, each component within the electric vehicles must be designed with particular characteristics in mind. Specifically, considerations related to the weight and structural integrity of each component must be weighed to ensure that the electric vehicles are both efficient and safe to operate. For example, the body of the vehicle must be stiff, efficient, and lightweight. A lightweight body helps counteract the additional weight of the batteries, which may be in the form of several large batteries, or numerous (sometimes thousands) of smaller batteries wired together. The stiff body helps make the vehicle more stable during cornering and also helps limit damage to the body and batteries during a collision. Protection of the batteries during a collision is particular important, as the large number of batteries pose a significant fire hazard and may also expose passengers and others to highly corrosive material. Due to this high safety risk, it is imperative that the body structure be designed to withstand high force collisions from any direction.

Figure 1:
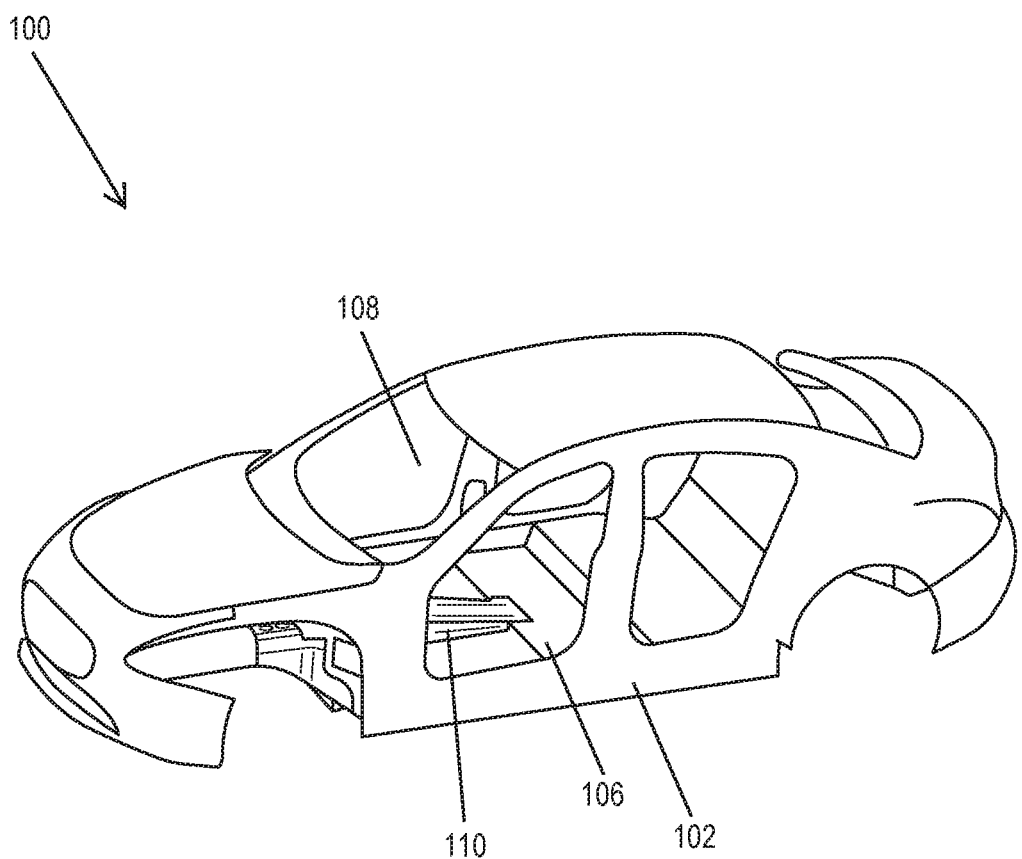
FIG. 1 depicts an electric vehicle according to embodiments.

Turning now to FIG. 1, one embodiment of an electric vehicle 100 is shown. While shown here as an electric automobile, electric vehicle 100 may be any motorized vehicle that is powered by electricity. For example, electric vehicle 100 may include vehicles such as cars, buses, trains, trucks, trams, watercraft, aircraft, and/or any other type of transportation mechanism.

Here, much of the main body 102 of the electric vehicle 100, especially those components designed to form the skeleton of the vehicle and those components used for collision protection, are made of aluminum or alloys containing aluminum, although it will be appreciated that other materials may be considered. Aluminum alloys provide strong, yet lightweight components that help shed weight to compensate for the high weight of the batteries necessary to power the electric vehicle. For electric vehicles, an increased emphasis is placed on protection of the batteries as damage to battery cells can cause explosion and fires within the vehicle. Such problems are compounded due to the large amount of space batteries must occupy within electric vehicles in order to maintain practical driving ranges. Therefore, vehicle alterations that provide increased protection along edges and corners of the vehicle battery are advantageous. Such alterations may include considerations related to, but not limited to providing: (1) increased rigidity of the vehicle, (2) increased absorption of energy from a collision, and (3) increased efficiency of transfer of energy/force stemming from an impact to the vehicle's body to lessen the potential impact applied to the vehicle battery and to passengers in the vehicle.

Battery elements 104 are positioned underneath a floor structure 106 of the electric vehicle 100. Such positioning provides several benefits. First, the battery elements are isolated from the passenger compartment, largely by an aluminum (or other metallic material) floor structure 106, which helps increase passenger safety. The placement of the battery elements 104 underneath the vehicle 100 also allows the battery elements 104 to be connected to electrical systems of the vehicle 100 from underneath the floor structure 106. This enables the battery elements 104 to be changed out from the exterior of the vehicle 100. For example, the vehicle 100 may be raised up and the battery elements 104 may be decoupled from the underside of the vehicle 100. As just one example, a number of bolts or other fasteners may be removed and the battery elements 104 may be lowered from the vehicle 100. The battery elements 104 may be disconnected and new battery elements 104 may be connected and fastened to the underside of the vehicle 100. This allows old batteries to be replaced easily, and also enables a quick swap of depleted battery elements 104 for charged battery elements 104, serving as a method of rapidly charging the vehicle 100 for longer trips. The placement of the battery elements 104 also places much of the weight of the vehicle 100 near the ground, thus lowering the center of gravity of the vehicle 100 and allowing the vehicle 100 to corner better and reduces the odds of a rollover.

Unlike automobiles that utilize internal combustion engines and include drivetrains that extend along a length of the vehicle, electric vehicle 100 is driven by one or more electric motors positioned near the wheel axles. As a result, there is no need for a longitudinal drive train. To help isolate a passenger compartment 108 from the battery elements 104 while providing access for connections of the battery elements 104 to be connected to electric systems within the passenger compartment 108 and to the one or more electric motors, the passenger compartment may be provided with a rigid tunnel 110 protruding upward from a floor structure 106 of the passenger compartment 108. However, unlike in conventional gas-powered vehicles where a tunnel may be provided to provide clearance for a drivetrain, rigid tunnel 110 is included to provide clearance for a portion of the battery elements 104 used to supply power to the electric vehicle 100. The rigid tunnel 110 may not only provide a housing for a portion of the battery assembly, but may serve a number of other functions. As just one example, the rigid tunnel 110 may help absorb and transfer force away from passengers in the event of a collision. In such embodiments, the rigid tunnel 110 may be formed of carbon fiber or another composite material that is extremely strong and lightweight. In other embodiments, the rigid tunnel 110 may serve as part of an air ventilation system, with hot or cold air being vented to the passenger compartment 108 through a portion of the rigid tunnel 110.

Figure 2:
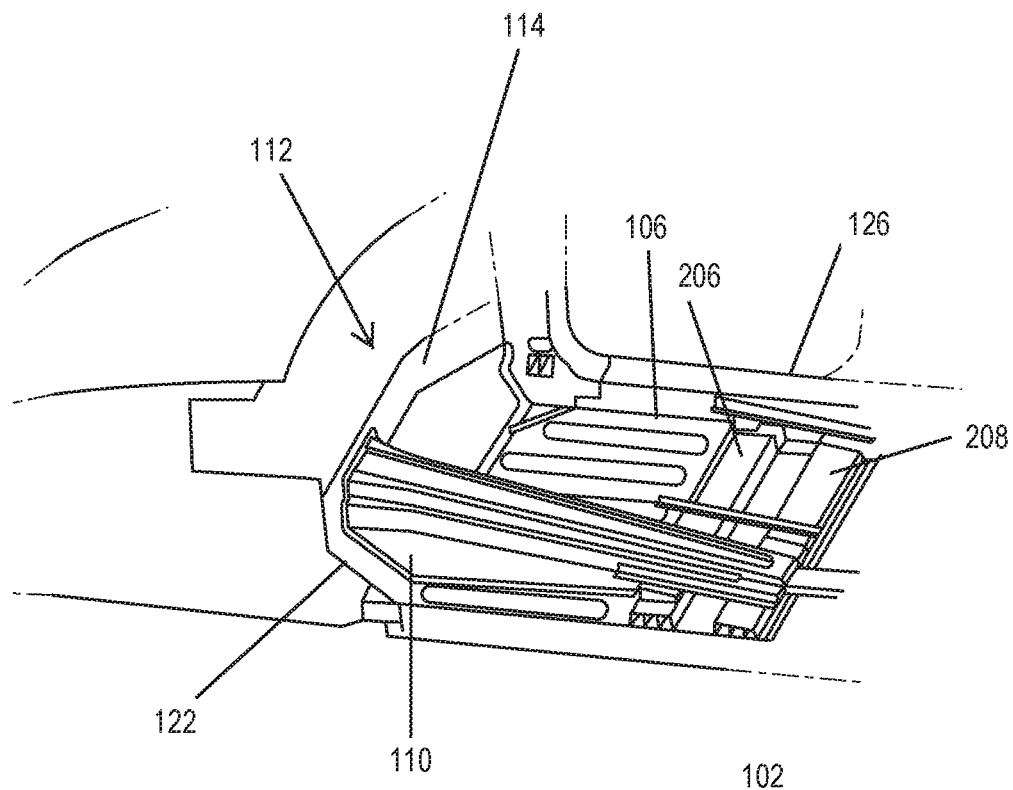
FIG. 2 depicts a mounting system for an electric vehicle according to embodiments.

In some embodiments, a firewall 112 of the may be coupled with the rigid tunnel 110, which may extend rearward from the firewall 112 to one or more central cross beams 132 as shown in FIG. 2. For example, a front edge of the rigid tunnel 110 may be coupled with a medial portion of the angled portion 122 and a medial portion of the front cross beam 114. The front edge of the rigid tunnel 110 may be open, such that access to the motor compartment may be provided underneath the rigid tunnel 110. A rear portion of the rigid tunnel 110 may be coupled with the central cross beams 132. For example, a forward most of the central cross beams 132 may be coupled with an underside of the rigid tunnel 110, such as within a notch in the rigid tunnel 110 that is configured to receive the forward most central cross beam 132. The rearmost central cross beam 132 may be configured to couple with and/or near a rear edge of the rigid tunnel 110. The central cross beams 132 may extend laterally across a width of the passenger compartment 108. In some embodiments, a top surface of one or more of the central cross beams 132 may be configured to be used as mounting points for the front seats. For example, the top surface of one of more of the central cross beams 132 may define apertures that are configured to receive bolts and/or other fastening mechanisms for coupling seat rails 164 and/or other seat mounts to the central cross member(s) 132. In some embodiments, seat brackets may be mounted to one or more of the central cross beams 132. These brackets may then receive seat rails 164 with which seats may be mounted. Oftentimes, each seat will be mounted to two seat rails 164, although it will be appreciated that other numbers of rails 164 may be used.

In some embodiments, the central cross beams 132 (as well as other support members secured to the floor structure 106, as well as the floor structure 106 itself) may be configured to have the battery assembly 104 mounted thereon. For example, a lower surface of one or more of the central cross beams 132 may be configured to receive one or more removable fastening mechanisms, such as bolts, that are used to secure the battery assembly 104 to an underside of the floor structure 106. As just one example, the central cross beams 132 may be positioned atop the floor structure 106, with the battery element 104 positioned against an underside of the floor structure 106 (possibly with one or more intervening layers and/or components between the battery element 104 and the floor structure. One or more bolts may extend from an underside of the battery element 104, through the floor structure 106, and into an interior of one or more of the central cross beams 132. The bolts or other fasteners may be positioned through apertures in the battery element 104 and/or a flange of the battery element 104. The central cross beams 132 provide strong mounting locations for the battery element 104, allowing the battery element 104 to be larger and provide the vehicle 100 with a longer range.

The central cross beams 132 may also serve to strengthen the sides of the passenger compartment 108 and to protect the passenger compartment 108 in the event of an impact. The front cross beam 114 (and rest of firewall 112) may be configured to transfer force from a frontal collision from the front crash beams 128 and 130 to the one or more central cross beams 132 via the rigid tunnel 110. Additionally or alternatively, the front cross beam 114 (and rest of firewall 112) may also be configured to transfer force from a frontal collision from the front crash beams 128 and 130 to the left longitudinal support beam 124 and the right longitudinal support beam 126.

Figure 3:
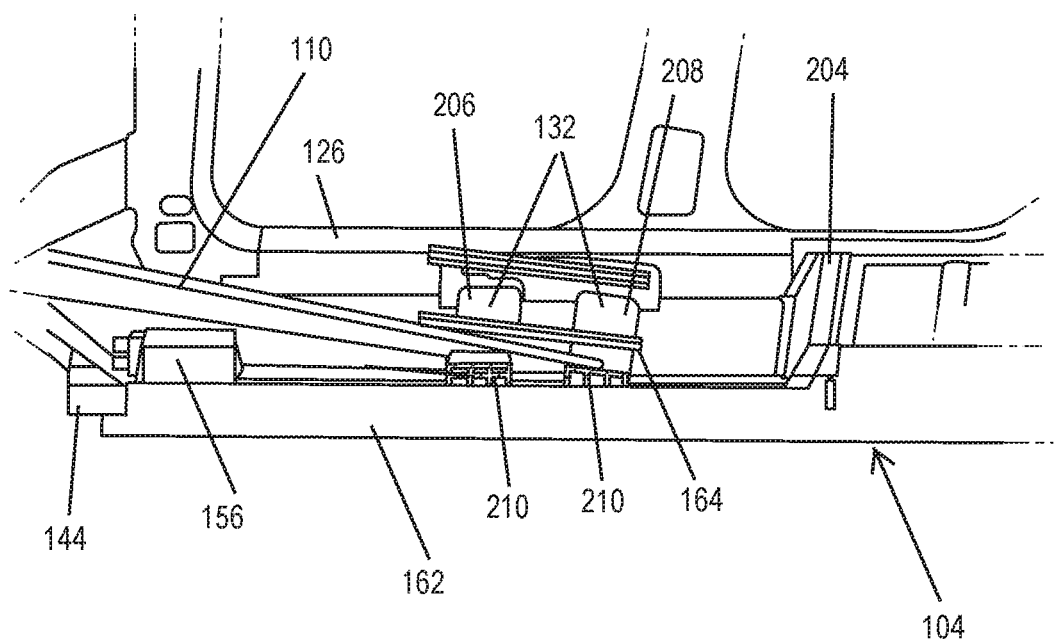
FIG. 3 depicts a cross-section view of a tunnel of an electric vehicle according to embodiments.

Battery assembly 104 may be configured to mount with an underside of the floor structure 106. The battery assembly 104 may include at least one battery 162, but often includes a large number of batteries ranging from dozens to thousands, depending on the size of each of the batteries. In some embodiments, the battery 162 includes a number of battery units arranged in two tiers as best seen in FIG. 3. For example, a first tier may extend underneath all or part of the passenger compartment 108, while a second tier may be stacked upon a portion of the first tier such that it extends upward at a position rearward of the passenger compartment 108. In some embodiments, the upper tier of the battery assembly 104 may be positioned rearward of a rear cross beam 204. Rear cross beam 204 may extend across a width of the passenger compartment 108. The rear cross beam 204 may be configured to receive one or more fasteners configured to secure the battery assembly 104 to the underside of the vehicle 100. In some embodiments, the rear cross beam 204 may also be used to mount one or more rear seats within the passenger compartment 108.

The battery assembly 104 may also include a battery connector housing 156. The battery connector housing 156 may be configured to house at least one battery connector therein. The battery connector housing 156 may define at least one electric connector configured to couple with at least one electric system of the electric vehicle 100, such as the electric motor. The battery connector housing 156 may be configured to be inserted within the aperture 152 of the floor structure 106 such that at least a portion of the battery connector housing 156 extends above a top surface of the floor structure 106. This allows the electric connectors to be accessible through a front opening of the rigid tunnel 110, enabling the battery element 104 to be electrically coupled to both the motor and the other electrical systems of the vehicle 100. Battery assembly 104 may be secured to the underside of the floor structure 106 using fasteners accessible from the underside of the floor structure 106 such that the battery assembly 104 is removable from the electric vehicle 100 without accessing the passenger compartment 108. These fasteners may be spaced apart along the underside of the vehicle 100 at the floor structure 106, central cross beams 132, a subfloor cross beam 144, and/or other structural elements, with a spacing and number of fasteners being determined by a weight, size, and/or shape of the battery element 104.

Rigid tunnel 110 may be coupled with the firewall 112, such as at a rear surface of the firewall 112. The rigid tunnel 110 may also be coupled with the floor structure 106 and the central support beams 132. The rigid tunnel 110 may be configured to cover the portion of the battery connector housing 156 that extends above the floor structure 106 such that the passenger compartment 108 is sealed from the battery connector housing 156.

The central cross beams 132 may form a mounting system for the vehicle 100. The mounting system may include a front central cross beam 206 that extends from a right side of a passenger compartment 108 to a left side of the passenger compartment 108. The mounting system also includes a rear central cross beam 208 extending from the right side to the left side at a positioned rearward of the front central cross beam 206. An underside of each of the front central cross beam 206 and the rear central cross beam 208 may define a number of mounting features. Each mounting feature may be configured to received or otherwise engage with a fastener or other securement mechanism to mount the battery assembly 104 to an underside of the electric vehicle 100. In some embodiments, the mounting features may spaced apart across lengths of the front central cross beam 206 and the rear central cross beam 208 such that the load of the battery is spread out along a width of the electric vehicle 100.

In some embodiments, the front central cross beam 206 and the rear central cross beam 208 may be configured to absorb force from a frontal collision that is transferred to the front central cross beam 206 and the rear central cross beam 208 via the rigid tunnel 110 that is coupled between a firewall of the electric vehicle 100 and the front central cross beam 206 and the rear central cross beam 208. The beams may also be configured to help protect the passenger compartment 108 and battery assembly 104 from side impacts. To help absorb greater amounts of force in the event of either a front or side impact, as well as to generally strengthen the beams, the front central cross beam 206 and the rear central cross beam 208 may each define an interior having a number of ribs formed therein. The ribs may extend longitudinally through the front central cross beam 206 and the rear central cross beam 208. For example, multiple vertical ribs 210 may extend between respective top surfaces and bottom surfaces of the front central cross beam 206 and/or the rear central cross beam 208. Here, ribs 210 may be positioned at equal intervals within the interior of the beams. In some embodiments, each mounting features is positioned between two of the ribs 210 in a central portion of the width of the respective cross beam.

In some embodiments, the front central cross beam 206 and/or the rear central cross beam 208 may be formed of aluminum or aluminum alloys. The use of aluminum, rather than a more rigid material such as steel, not only reduces the weight of the vehicle 100, but also allows more of the energy from a collision to be absorbed, such as by designing the aluminum central cross beams 206 and 208 to crumple in an accordion-like manner. Such crumpling may be achieved by outer walls of the cross beams being chamfered and/or the walls being generally octagonal in shape. To facilitate the formation of the ribs 210, the front central cross beam 206 and the rear central cross beam 208 may be extruded from aluminum such that the ribs 210 are formed along with the outer walls of the central cross beams 206 and 208. In some embodiments, connection points between the ribs 210 and the outer walls of the cross beams 206 and 208 may taper outward such that a thickness near the connection point is greater than a thickness of the rest of the ribs 210. Similarly, junctions of any ribs with one another may also have greater thicknesses than the rest of the ribs.

The front central cross beam 206 and the rear central cross beam 208 may also be configured to support one or more seats of the electric vehicle 100. For example, each central cross beam 206 and 208 may include one or more mounting locations on which a number of seat rails 164 may extend across and be mounted to the front central cross beam 206 and the rear central cross beam 208. For example, the mounting locations may be configured to each receive a fastener or other securement mechanism. In other embodiments, the seat rails 164 may be mounted directly to a collar or sleeve, which may then be secured to a mounting location on the front central cross beam 206 or rear central cross beam 208. For example, the seat rails 164 may be welded and/or otherwise attached to a sleeve. The seat rails 164 may be being configured for mounting seats within the passenger compartment 108. For example, seats may be slidingly engaged with one or more of the seat rails 164 such that a position of each seat within the passenger compartment 108 may be adjusted by sliding the seat along a length of its respective seat rails 164. In other embodiments, brackets may be provided that mount on the central cross beams 132 that are configured to receive rails 164.

Figure 4:
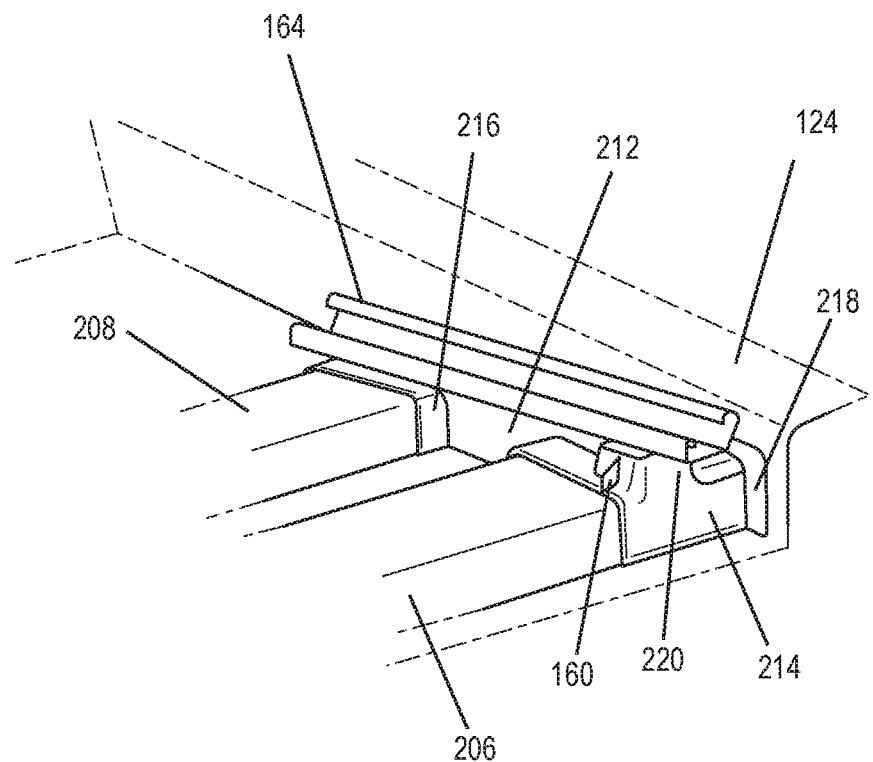
FIG. 4 depicts a seat mounting system of an electric vehicle according to embodiments.

FIG. 4 depicts a system for coupling the central cross beams 132 to an outer frame of the vehicle 100. The system may include at least one longitudinal support beam coupled with a chassis 292 of the electric vehicle 100. For example, a left longitudinal beam 124 may extend along a left side of the electric vehicle 100. A right longitudinal beam 126 may extend along a right side of the vehicle 100. In some embodiments, the longitudinal beams 124 and 126 define a sill of the passenger compartment 108. The longitudinal beams 124 and 126 may be configured to absorb and transfer force in a manner to protect the battery elements 104 and the passenger compartment 108. For example, the right and left longitudinal beams 124 and 126 may each be formed of aluminum or aluminum alloys.

The use of aluminum, rather than a more rigid material such as steel, not only reduces the weight of the vehicle 100, but also allows more of the energy from a collision to be absorbed, such as by designing the aluminum longitudinal beams 124 and 126 to crumple in an accordion-like manner. Such crumpling may be achieved by outer walls of the right and left longitudinal crash beams 124 and 126 being chamfered and/or formed to include one or more indentations designed to encourage the controlled crumpling in the event of an impact.

To aid in handling larger forces, each of the left longitudinal beam 124 and the right longitudinal beam 126 defines an interior comprising a plurality of ribs extending along a length of the right and left longitudinal beams 124 and 126. The ribs may extend through the entire interior to couple multiple walls together, thus providing additional material and material thickness to absorb and transfer greater forces. For example, the right and left longitudinal beams 124 and 126 may each include one or more vertical ribs extending from a top wall to a bottom wall and/or one or more horizontal rib extending from one side wall to another side wall of the longitudinal beams 124 and 126. In other embodiments, ribs may be diagonally oriented. To facilitate the formation of the ribs, the left and the right longitudinal beams 124 and 126 may be extruded from aluminum such that the ribs are formed along with the outer walls of the longitudinal beams 124 and 126. In some embodiments, connection points between the ribs and the outer walls of the longitudinal beams 124 and 126 may taper outward such that a thickness near the connection point is greater than a thickness of the rest of the ribs. Similarly, any junctions of the ribs with one another may also have greater thicknesses than the rest of the ribs.

The connection system may also include the front central cross beam 206 and a rear central cross beam 208 that each extend from a right side of the passenger compartment 108 to a left side of the passenger compartment 108. In some embodiments, an underside of the front central cross beam 206 and the rear central cross beam 208 each define a number of mounting features configured for mounting the battery elements 104 to an underside of the electric vehicle 100. For example, a number of fasteners may be inserted into the mounting features to bolt on or otherwise fasten the battery elements 104 to the electric vehicle 100. The front central cross beam 206 and rear central cross beam 208 may be oriented generally orthogonal to the longitudinal support beams 124 and 126 and may be configured to extend between the longitudinal support beams 124 and 126. To aid in handling larger forces, the front central cross beam 206 and rear central cross beam 208 may each define an interior having one or more ribs extending along its respective length. The ribs may extend through the entire interior to couple multiple walls together, thus providing additional material and material thickness to absorb and transfer greater forces. To facilitate the formation of the ribs, the front central cross beam 206 and rear central cross beam 208 may be extruded from aluminum such that the ribs are formed along with the outer walls of the cross beams.

The seat mounting system may also include a connector 212 disposed between one of the longitudinal support beams 124 and 126 and both the front central cross beam 206 and the rear central cross beam 208. The connector 212 may be configured to couple the longitudinal support beam 112 with both the front central cross beam 206 and the rear central cross beam 208. The connector 212 may include a forward first portion 214 configured to receive an end of the front central cross beam 206 and a rearward second portion 216 configured to receive an end of the rear central cross beam 208. For example, the first portion 214 and second portion 216 may define a generally rectangular (or other shape corresponding to a cross-sectional shape of the front central cross beam 206 and rear central cross beam 208) chamber in which the end of the respective cross beam may be inserted and secured. In some embodiments, the first portion 214 and the second portion 216 may each define a flange configured to extend around an entire (or a substantial amount) outer periphery of the end of the respective cross beam. The flange may have a length of at least about 1-3 cm, although other lengths may be used. Such a length ensures that a sufficient amount of the front central cross beam 206 or rear central cross beam 208 is secured within the first portion 214 or second portion 216, while providing sufficient surface area through which one or more securement mechanisms, such as fasteners, weld beads, and the like, may be applied.

Connector 212 may also include a third portion 218 that is configured to engage with a medial portion of one of the longitudinal support beams 124 or 126. For example, the third portion 218 may include a flange that is configured to contact a side face of one of the longitudinal support beams 124 or 126. The flange may then be fastened or otherwise secured to the side of the longitudinal support beam 124 or 126. The flange may be sufficiently wide to accommodate any fastening mechanisms used to couple the connector 212 and longitudinal support beam 124 or 126. The flange of the third portion 218 may be generally orthogonal to the flanges of the first portion 214 and the second portion 216, allowing the connector 212 to couple the orthogonally oriented beams. In some embodiments, the flange of the third portion 218 may be expanded to wrap around one or more corners of the longitudinal support beam 124 or 126 such that the flange contacts multiple sides of the longitudinal support beam 124 or 126. For example, the flange of the third portion 218 may form a generally u-shaped receptacle that may be positioned around a portion of the longitudinal support beam 124 or 126.

The connector 212 is configured to couple several orthogonally oriented components, with the first portion 214 and the second portion 216 being configured to receive an end of one component in a first direction while the third portion 218 is configured to secure a side of a second component from a second direction opposite the first. A base of the flange of the third portion 218 and a base of each of the generally rectangular chambers of the first portion 214 and the second portion 216 may be the shared and/or aligned in a generally parallel layout. Due to the complex design of the connector 212, it may be cast or pressed out of aluminum.

In some embodiments, the connector 212 includes an elevated section 220 that is configured to raise a height of the connector 212 at a position above the front central cross beam 206 to a level higher than at a position above the rear central cross beam 208. For example, the elevated section 220 may include a protrusion that extends above a main surface of the connector 212, with the main surface being planar with, or proximate a height of the flanges of the first portion 214 and the second portion 216. In some embodiments, a support fin 160 extends between an upper portion of the elevated section 220 and a main surface of the first portion 214. The elevated section 220 may serve to support a forward mounting for at least one seat rail 164, which may be configured for slidably mounting a seat within the passenger compartment 108. A rear mounting of the seat rail 164 may be positioned on or near the second portion 216 at a position proximate to the rear central cross beam 208. The seat rail 164 extends across the front central cross beam 206 and the rear central cross beam 208 and is mounted such that a forward portion of the one seat rail 164 extends higher than a rear portion of the seat rail 164. This may be done using the elevated section 220. Seat rail 164 may be welded, fastened, and/or otherwise secured to the connector 212. Oftentimes, the seat rail 164 is positioned to be generally parallel to and laterally spaced apart from the longitudinal support beam 124 or 126.

Figure 5:
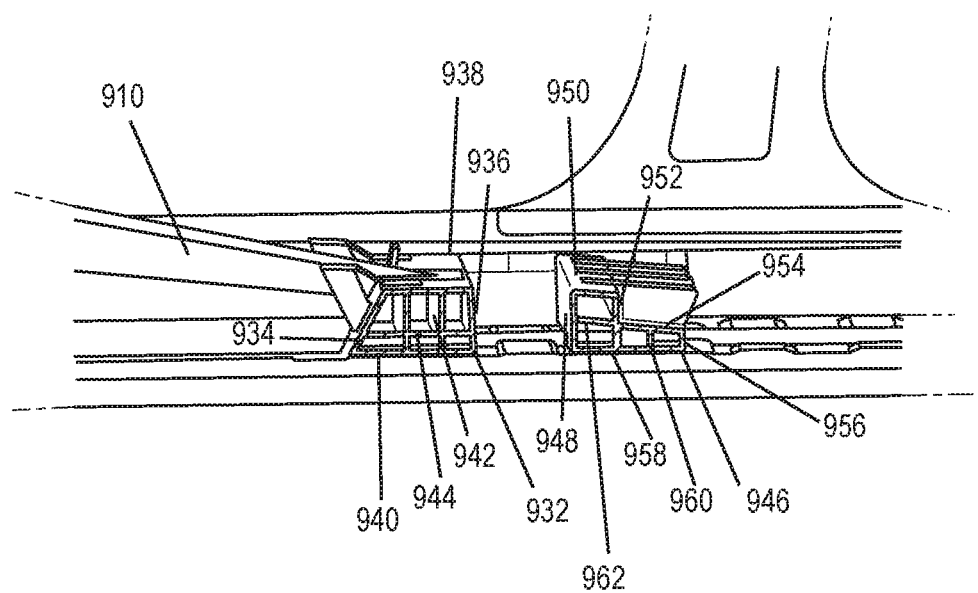
FIG. 5 depicts central cross beams for an electric vehicle according to embodiments.

FIG. 5 depicts an alternative embodiment of a rigid tunnel 910. Here, rigid tunnel 910 extends only to a forward most central cross beam 932. The forward most central cross beam 932 has a side profile defined by a front side 934, a rear side 936, a top side 938, and a bottom side 940. In some embodiments, the front side 934 and the rear side 936 may not be parallel. For example, the front side 934 may be angled forward and downward from the top side 938. A rear end of the rigid tunnel 910 may be coupled with the top side 938 and/or the front side 934 of the forward most central cross beam 932. The rigid tunnel 910 may include a flange 912 that couples with the top side 938 and/or the front side 934 of the forward most central cross beam 932. In some embodiments, the forward most central cross beam 932 may define an interior that includes a plurality of ribs 942. The ribs 942 extend vertically between the top side 938 and the bottom side 940. Here, two ribs are disposed within the interior such that two rectangular chambers and a trapezoidal chamber are formed. Additional horizontal ribs 944 may be provided within the chambers. For example, each of the chambers may include at least one rib 944 that divides the chamber into multiple sections. Ribs 944 provide additional strength and rigidity to the vertical ribs 942. The use of ribs 942 and 944 help stiffen and strengthen the forward most central cross beam 932 without adding a substantial amount of material or weight, thereby allowing the forward most central cross beam 932 to handle larger impact forces in the event of a collision.

The rearmost central cross beam 946 may have a profile defined by a front side 948, a first top side 950, an intermediate wall 952, a second top side 954, a rear side 956, and a bottom side 958. The profile may be shaped such that a forward portion of the rearmost central cross beam 946 is larger than a rear portion of the rearmost central cross beam 946. In some embodiments, one or both of the first top side 950 and the second top side 954 may be sloped downward from front to back. The sloped surface may be configured to receive one or more brackets on which seats and/or seat rails may be mounted. In some embodiments, the sides of the rearmost central cross beam 946 define an open interior. A plurality of ribs 960 may extend within the open interior. The ribs 960 extend vertically between the second top side 954 and the bottom side 958. Here, two ribs are disposed within the interior, with a forward rib being in line with the intermediate wall 952. An additional horizontal rib 962 may be provided within the interior. For example, a horizontal rib 962 may extend into a forward portion of the rearmost central cross beam 946 in line with the second top side 954. The use of ribs 960 and 962 help stiffen and strengthen the rearmost central cross beam 946 without adding a substantial amount of material or weight, thereby allowing the rearmost central cross beam 946 to handle larger impact forces in the event of a collision.

Figure 6:
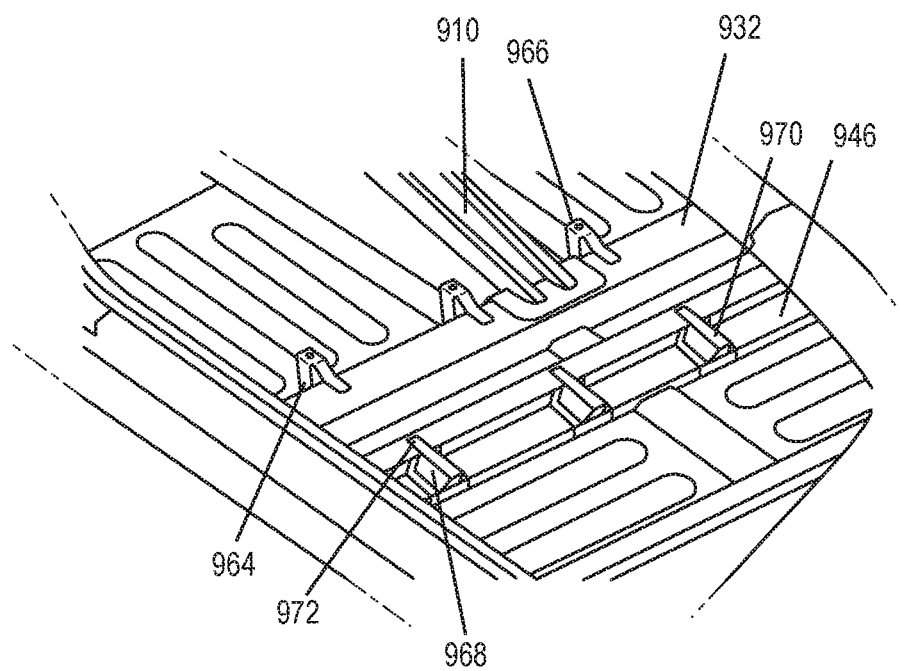
FIG. 6 depicts a seat mounting system for an electric vehicle according to embodiments.

FIG. 6 shows one embodiment of brackets being mounted to the forward most central cross beam 932 and the rearmost central cross beam 946. Front brackets 964 are configured to mount to the forward most cross beam 932. For example, both the driver side and the passenger side of the passenger compartment 108 may include two or more front brackets 964. Front brackets 964 may have a top mounting surface 966 that is configured to receive a seat rail or other seat mount at a position elevated above a top surface of the forward most central cross beam 932. For example, each front bracket 964 may have a forward coupling and a rear coupling for mounting the front bracket 964 on the forward most cross beam 932. The forward coupling may be configured to be secured to the front side 934 of the forward most cross beam 932, such as by using fasteners, adhesives, welding, and/or other known securement techniques. In some embodiments, the forward coupling may include a flange that is designed to sit flush against the angled front side 934 as seen in FIG. 5. Fasteners and/or other fastening mechanisms may be used to secure this flange to the front side 934. The rear coupling may be configured to be secured with the top side 938 of the forward most central cross beam 932. For example, the rear coupling may include a flange that is configured to sit flush against and be secured to the top side 938. The top mounting surface 966 may extend upward and or forward from the rear coupling and include a threaded hole for receiving a bolt or other fastener for securing a seat rail to the front bracket 964. This allows the seat rails or other seat mounting to be positioned at a height greater than the top side 938 of the forward most central cross beam 932 such that the seat rails may be sloped from front to back for easier adjustment of the seat.

Rear brackets 968 may have a rear portion 970 that is configured to sit on the second top side 954 of the rearmost central cross beam 946. In some embodiments, the rear portion 970 may have a thickness such that a top surface of the rear portion 970 is generally at the same height as the first top side 950. The rear portion 970 may define a threaded hole that is configured to receive a bolt or other fastener for securing a seat rail to the rear bracket 968. Oftentimes, the top surface of the rear portion 970 is positioned at a lower height than the top mounting surface 966 of the front bracket 964 such that a seat rail extending between the front bracket 964 and the rear bracket 968 slopes slightly downward from front to back. In some embodiments, the rear brackets 968 may each include a front portion 972, such as a flange that extends onto the first top side 950. This flange may be secured to the first top side 950, such as by using fasteners, adhesives, welding, and/or other securement mechanisms to provide greater support for the rear bracket 968 and/or seat rails.

Figure 7:
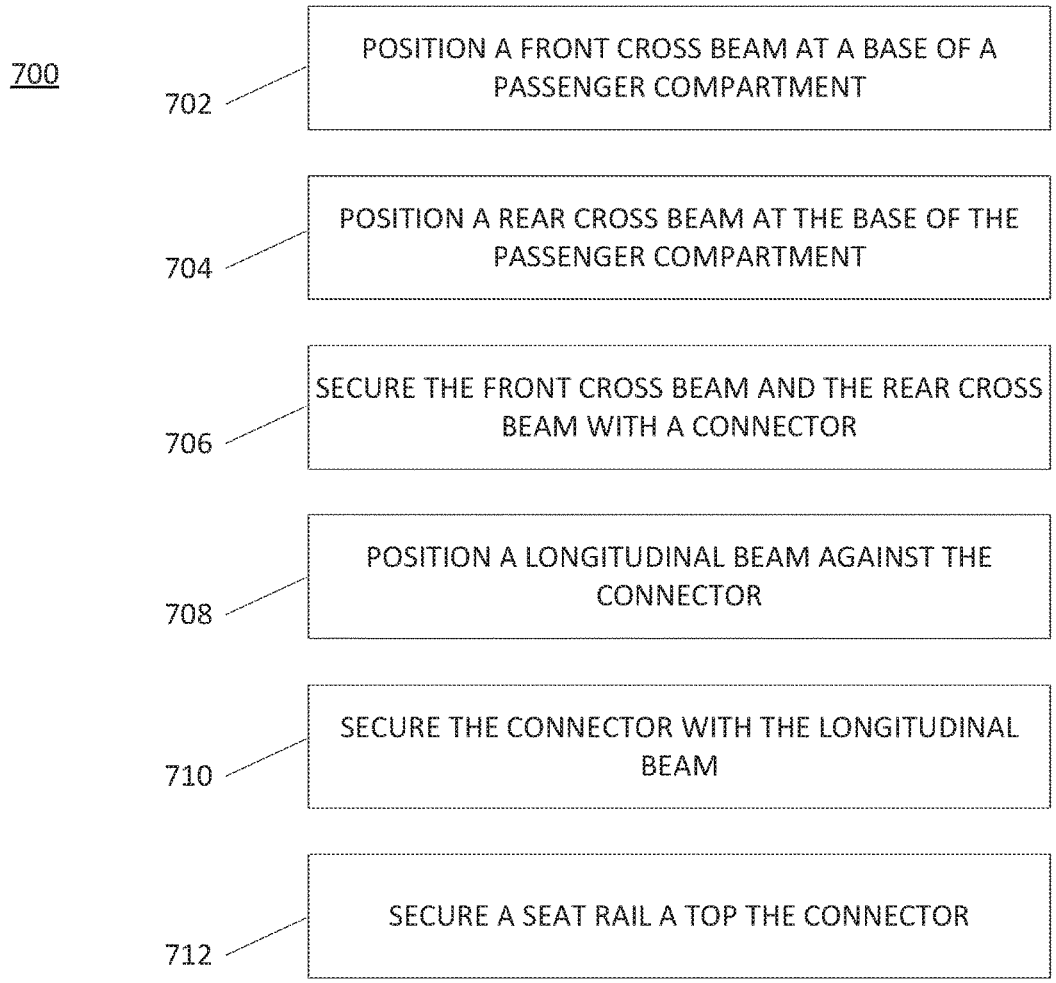
FIG. 7 is a flowchart depicting a method for mounting a seat within an electric vehicle according to embodiments.

FIG. 7 is a flowchart depicting a process 700 for mounting a seat rail of an electric vehicle. Process 700 may be performed using the electric vehicle 100 described herein. Process 700 may begin at block 702 by positioning a front cross beam at a base of a passenger compartment of an electric vehicle such that the front cross beam extends from a left side of the passenger compartment to a right side of a passenger compartment. The front cross beam may be configured to provide structure to the passenger compartment of the electric vehicle and may define a number of mounting locations with which a battery assembly may be mounted to an underside of the vehicle. At block 704, a rear cross beam may be positioned at the base such that the rear cross beam extends from the left side to the right side. At block 706, an end of the front cross member may be secured within a first portion of a connector and an end of the rear cross member may be secured within a second portion of the connector. For example, each of the first portion and the second portion may define a flange configured to extend around an entire outer periphery of the end of the respective cross beam. The flange may form a chamber having an inner profile corresponding an outer profile of the respective cross beam such that the end of the cross beam may be inserted within the chamber. In some embodiments, securing the first portion and the second portion may involve fastening the flanges to the outer periphery of the end of the cross beams. A medial portion of a longitudinal support beam may be positioned against a third portion of the connector at block 708. The longitudinal support beam may extend along a side of the vehicle, and in some embodiments, may form a sill of the passenger compartment.

At block 710, the third portion of the connector may be secured to the medial portion of the longitudinal support beam. For example, the third portion may define a flange that is orthogonal to the flanges of the first portion and second portion. The flange of the third portion may be configured to extend around all or part of a side wall of the longitudinal support beam and in some embodiments may extend around at least a portion of one or both of a top wall or a bottom wall of the longitudinal support beam, thus forming a generally u-shaped receptacle. In some embodiments, securing the third portion may involve fastening the flange to one or more of the side wall, the top wall, or the bottom wall of the longitudinal support beam. A seat rail may be secured to a top of the connector at block 712 such that a forward portion of the seat rail extends higher than a rear portion of the seat rail. For example, the connector may include a forward section positioned proximate the front cross beam and a rear section positioned proximate the rear cross beam. The forward section may include an elevated portion on which the forward portion of the seat rail is mounted such that the seat rail slopes downward from forward to back. Once the seat rail is secured, a mating feature of a seat may be slidingly engaged with the seat rail.

In some embodiments, process 700 may also include positioning a battery assembly against an underside of the electric vehicle. A number of fasteners may then be inserted through the battery assembly and engaged with a number of mounting features defined within the front cross beam and rear cross beam to secure the battery assembly against the underside of the electric vehicle.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A seat mounting system for an electric vehicle, comprising:
    a longitudinal support beam coupled with a chassis of the electric vehicle;
    a front cross beam extending from a right side of a passenger compartment of the electric vehicle to a left side of the passenger compartment;
    a rear cross beam extending from the right side to the left side; and
    a connector disposed between the longitudinal support beam and both the front cross beam and the rear cross beam, the connector being configured to couple the longitudinal support beam with both the front cross beam and the rear cross beam, wherein:
        the connector comprises a forward section positioned proximate the front cross beam and a rear section positioned proximate the rear cross beam; and
        the forward section comprises an elevated portion that projects upward from an upper surface of the forward portion, the elevated portion being configured to raise the forward portion of the at least one seat rail;
    at least one seat rail mounted to the connector, the at least one seat rail extending across the front cross beam and the rear cross beam, the at least one seat rail being mounted to the connector such that a forward portion of the at least one seat rail extends higher than a rear portion of the at least one seat rail, the at least one seat rail being configured for mounting a seat within the passenger compartment.

2. The seat mounting system for an electric vehicle of claim 1, wherein:
    the at least one seat rail is generally parallel to and laterally spaced apart from the longitudinal support beam.

3. The seat mounting system for an electric vehicle of claim 1, wherein:
    the forward portion further comprises a support fin extending between an upper portion of the elevated portion and the upper surface of the forward portion.

4. The seat mounting system for an electric vehicle of claim 1, wherein:
    one or more of the front cross beam, the rear cross beam, and the longitudinal support beam comprise extruded aluminum; and
    the connector comprises cast aluminum.

5. The seat mounting system for an electric vehicle of claim 1, wherein:
    the at least one seat rail is configured to slidingly engage with a corresponding feature on the seat.

6. The seat mounting system for an electric vehicle of claim 1, wherein:
    the connector defines a flange configured to contact a portion of a side wall of the longitudinal support beam; and
    the flange has a width of between about 1-3 cm.

7. A seat mounting system for an electric vehicle, comprising:
    a longitudinal support beam coupled with a chassis of the electric vehicle;
    a front cross beam extending from a right side of a passenger compartment of the electric vehicle to a left side of the passenger compartment;
    a rear cross beam extending from the right side to the left side; and
    a connector disposed between the longitudinal support beam and both the front cross beam and the rear cross beam, the connector being configured to couple the longitudinal support beam with both the front cross beam and the rear cross beam, the connector comprising:
        a first portion configured to receive an end of the front cross beam, wherein the first portion comprises an elevated section configured to raise a height of the connector at a position above the front cross beam to a level higher than at a position above the rear cross beam, and wherein the first portion defines a first flange configured to extend around an entire outer periphery of the end of the front cross beam;
        a second portion configured to receive an end of the rear cross beam, wherein the second portion defines a second flange configured to extend around an entire outer periphery of the end of the rear cross beam; and
        a third portion configured to engage with a medial portion of the longitudinal support beam; and
    at least one seat rail extending across the front cross beam and the rear cross beam, the at least one seat rail being mounted to the first portion and to the elevated section of the third portion of the connector such that a forward portion of the at least one seat rail positioned above the front cross beam extends higher than a rear portion of the at least one seat rail positioned above the rear cross beam, the at least one seat rail being configured for mounting a seat within the passenger compartment.

8. The seat mounting system for an electric vehicle of claim 7, wherein:
    one or more of the front cross beam, the rear cross beam, and the longitudinal support beam comprise extruded aluminum; and
    the connector comprises cast aluminum.

9. The seat mounting system for an electric vehicle of claim 7, wherein:
    the first portion further comprises a support fin extending between an outer edge of the first portion and an upper portion of the elevated section.

10. The seat mounting system for an electric vehicle of claim 7, wherein:
    the third portion defines a flange configured to contact a portion of a side wall of the longitudinal support beam.

11. The seat mounting system for an electric vehicle of claim 7, wherein:
    the at least one seat rail is mounted to the connector using a plurality of fasteners.

12. The seat mounting system for an electric vehicle of claim 7, wherein:
    an underside of each of the front cross beam and the rear cross beam defines a plurality of mounting features configured for mounting a battery assembly to an underside of the electric vehicle.

13. A method for mounting a seat rail of an electric vehicle, the method comprising:
    positioning a front cross beam at a base of a passenger compartment of an electric vehicle such that the front cross beam extends from a left side of the passenger compartment to a right side of a passenger compartment;

positioning a rear cross beam at the base such that the rear cross beam extends from the left side to the right side;

securing an end of the front cross member within a first portion of a connector and an end of the rear cross member within a second portion of the connector, wherein the first portion defines a first flange configured to extend around an entire outer periphery of the end of the front cross beam and the second portion defines a second flange configured to extend around an entire outer periphery of the end of the rear cross beam;

positioning a medial portion of a longitudinal support beam against a third portion of the connector;

securing the third portion of the connector to the medial portion of the longitudinal support beam; and securing a seat rail to a top of the connector such that a forward portion of the seat rail extends higher than a rear portion of the seat rail.

14. The method for mounting a seat rail of an electric vehicle of claim 13, wherein:

the connector comprises a forward section positioned proximate the front cross beam and a rear section positioned proximate the rear cross beam; and the forward section comprises an elevated portion configured to raise the forward portion of the seat rail.

15. The method for mounting a seat rail of an electric vehicle of claim 13, wherein:

the third portion defines a flange configured to contact a portion of a side wall of the longitudinal support beam.

16. The method for mounting a seat rail of an electric vehicle of claim 13, wherein:

securing the third portion comprises fastening the third flange to the side wall of the longitudinal support beam.

17. The method for mounting a seat rail of an electric vehicle of claim 13, further comprising:

slidingly engaging a seat with the seat rail.

18. The method for mounting a seat rail of an electric vehicle of claim 13, further comprising:

positioning a battery assembly against an underside of the electric vehicle; and securing a plurality of fasteners with a plurality of mounting features defined in an underside of one or both of the front cross beam and the rear cross beam to secure the battery assembly against the underside of the electric vehicle.

* * * * *